Sept. 13, 1949.  A. L. MILLER  2,481,860
GRAIN CONVEYER SYSTEM
Filed Nov. 22, 1947  2 Sheets-Sheet 1

INVENTOR.
Alfred L. Miller
BY Thos. E. Asfield
ATTORNEY.

Sept. 13, 1949.　　　　　A. L. MILLER　　　　　2,481,860
GRAIN CONVEYER SYSTEM
Filed Nov. 22, 1947　　　　　　　　　　　　2 Sheets-Sheet 2
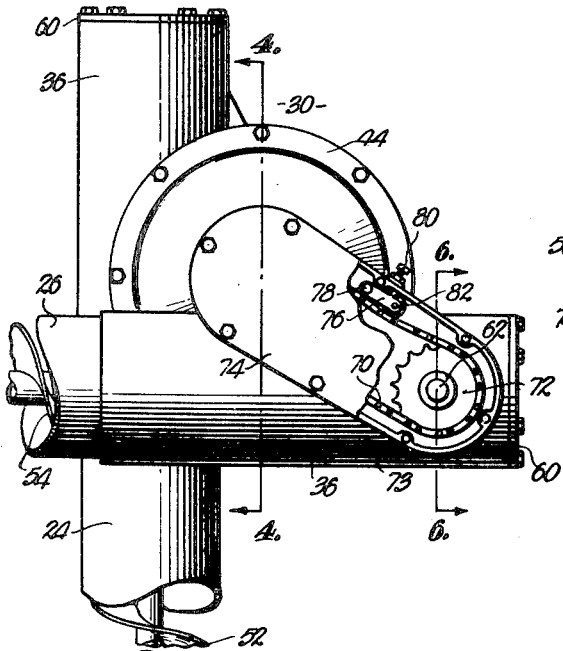
Fig. 4.
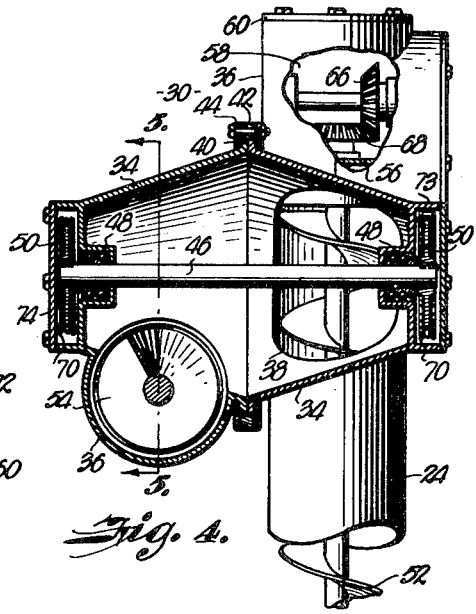
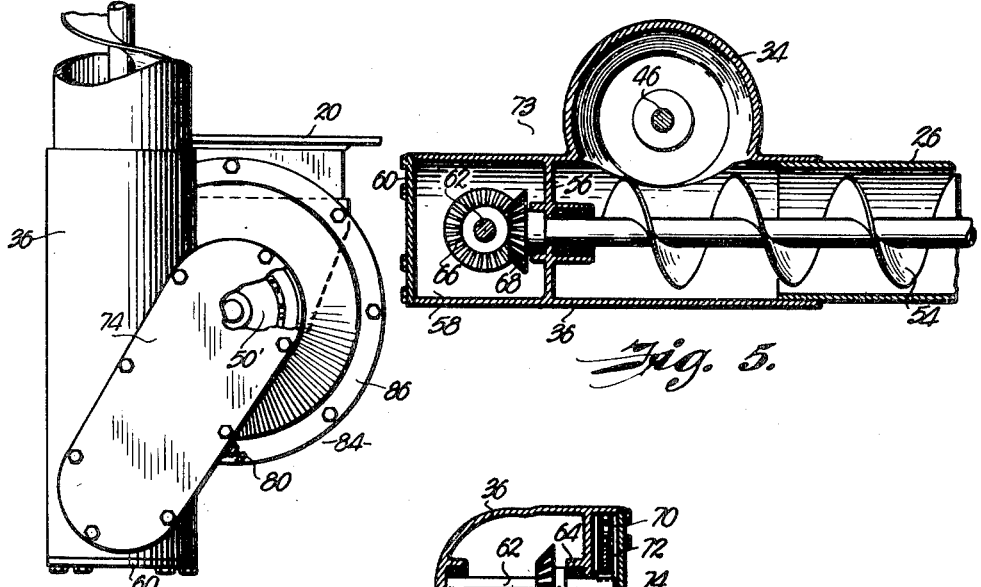
Fig. 5.
Fig. 3.
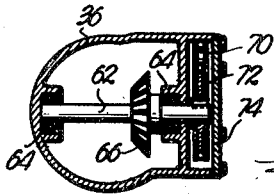
Fig. 6.
INVENTOR.
Alfred L. Miller
BY Thos. E. Anfield
ATTORNEY.

Patented Sept. 13, 1949

2,481,860

UNITED STATES PATENT OFFICE 2,481,860

GRAIN CONVEYER SYSTEM

Alfred L. Miller, Liberty, Mo., assignor to Desert Gold Feed Company, a partnership Application November 22, 1947, Serial No. 787,527

9 Claims. (Cl. 214—83.32)

The present invention relates in general to conveyor systems and it deals more particularly with conveyors which are carried by grain trucks or the like to unload the contents thereof.

The broad object of the invention is to provide a practical and efficient conveyor which is readily adjustable to discharge material at different locations relative to the intake through which the material enters the device. More specifically, it is an object of the invention to provide a conveyor adapted to discharge the material being handled on either side of the intake point, above or below the intake level, and at whatever distance from the intake is desired.

A further object is to provide a screw conveyor having a plurality of sections hinged together and having mechanism at each hinge for transmitting power from one section of the conveyor to the next.

Another object is to provide an elevator supporting at its upper end, in adjustable angular relationship thereto, a conveyor driven through the elevator mechanism.

Still another object of the invention is to provide a truck having an attached conveyor capable of unloading the contents of the truck quickly and conveniently and depositing said contents at any selected one of a number of locations relative to the truck.

A further object is to provide a truck-mounted conveyor which is collapsible for purposes of convenient transportation and extensible for a truck-unloading operation. Another object is to provide a truck-mounted conveyor of this character which does not interfere with conventional methods of loading the truck.

Other and further objects will appear in the course of the following description of the invention.

Figure 1:
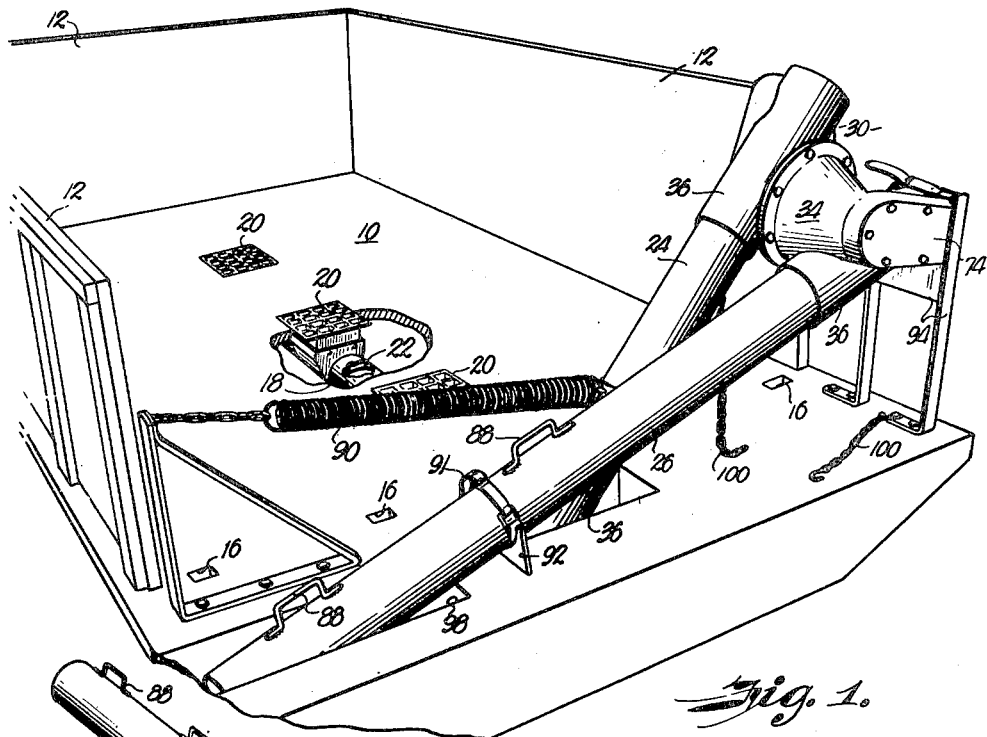
Figure 2:
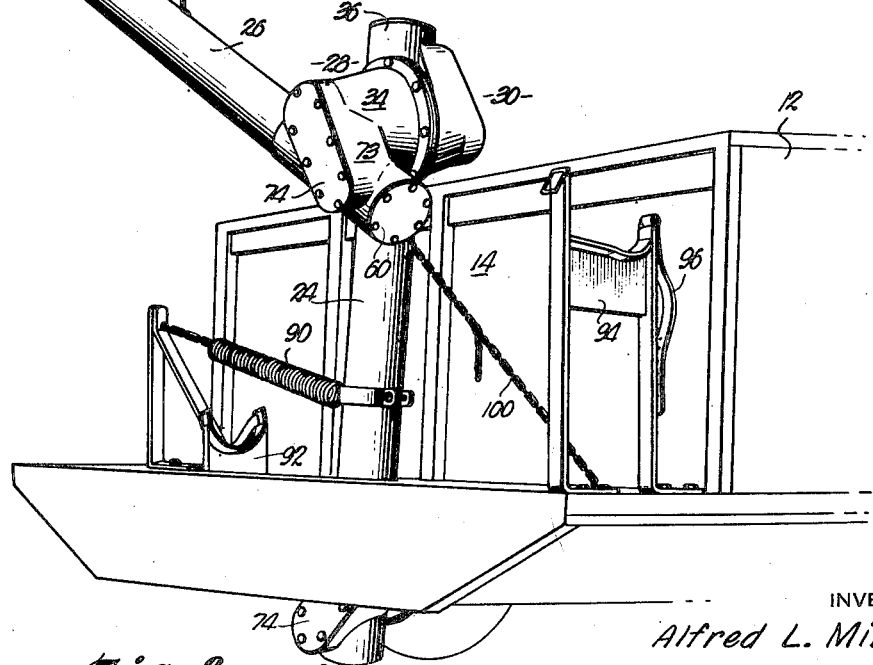

In the accompanying drawings which form a part of the specification and are to be read in conjunction therewith, and in which like reference numerals are employed to indicate like parts of the various views, Fig. 1 is a perspective view of a truck box showing my grain conveyor mounted on the rear end thereof and occupying its storage position, Fig. 2 is a perspective view taken from a different angle, showing the conveyor adjusted to a different position wherein its discharge end is elevated high above the truck bed, Fig. 3 is an elevational view of the conveyor, parts being broken away for purposes of illustration, Fig. 4 is a cross sectional view taken along the line 4—4 of Fig. 3 in the direction of the arrow, Fig. 5 is a cross sectional view taken along the line 5—5 of Fig. 4 in the direction of the arrows, and Fig. 6 is a cross sectional view taken along the line 6—6 of Fig. 3 in the direction of the arrows.

Referring more particularly to the drawings, the numeral 10 identifies the bed of a truck having side walls 12 and a removable end board 14, the latter normally being held in place in conventional fashion with the assistance of stakes or downwardly extending prongs insertable into apertures 16 in the bed of the truck.

Centrally situated under the truck bed is a horizontal screw conveyor comprising a stationary tubular housing 18 running lengthwise of the truck and having a series of longitudinally spaced intakes 20 on its upper side through which granular material may flow from the truck box into the conveyor under the influence of gravity. The granular material reaching the conveyor is moved rearwardly through the housing by means of a rotating worm or screw 22 which is driven by a suitable source of power, not shown, connected to its forward end; conveniently, this source may be the power take-off of the truck or an auxiliary motor, it being understood that the specific drive mechanism forms no part of the present invention.

The rear of the horizontal conveyor communicates with an auxiliary jointed conveyor, the construction of which now will be described in detail. Broadly speaking, this auxiliary conveyor comprises two pipes or tubes 24 and 26 hingedly jointed together by a pair of mating, relatively movable swivel members or heads 28 and 30.

The two heads are identical in form and corresponding parts thereof are indicated by similar reference numerals for convenience. Each has a truncated conical body or bell 34 and, integral therewith, a cylindrical sleeve 36 whose axis is crosswise and displaced laterally with respect to th axis of the bell, as best seen in Fig. 4. Thus, there is formed at the juncture of the sleeve and the bell an aperture 38.

The mouth of each bell (i. e., the large end) is provided with an outwardly projecting annular flange 40 and the two bells are fastened mouth-to-mouth in coaxial relationship by means of a circular channel assembly embracing the two flanges. The channel assembly comprises an annular spacing member 42 with rings 44 bolted on either side thereof to hold the flanged mouths of the bells together; the axial dimension of the spacer preferably is slightly greater than the combined thickness of the bell flanges so that the bells can be made to turn relative to one another about their common axis.

Aligned with this axis there is a shaft 46 whose purpose will be made clear presently. It is supported near its ends by bearings 48 arranged in the end walls of the respective bells, and outside of the end walls it is provided with sprockets 50 keyed to the shaft.

The cylindrical sleeves 36 carried by the two bells are shrunk onto the ends of pipes 24 and 26 or may be secured to the pipes by pins, rivets, welding or other suitable means. The pipes house conveyor screws or worms 52 and 54 respectively, the shaft of each worm being journaled in a partition 56 disposed crosswise of the associated sleeve. These partitions serve to separate the grain passageway from gear chambers 58 which normally are closed by cover plates 60 bolted on the ends of the sleeves 36.

In each gear chamber there is a cross shaft 62 disposed parallel to shaft 46 and supported by suitable bearings 64, as shown in Fig. 6. A bevel gear 66 meshing with bevel gear 68 on the conveyor shaft causes the cross shaft and conveyor shaft to turn together, and the cross shaft is connected to shaft 46 by means of a chain 70 and sprockets 50 and 72. The chain and sprockets are disposed in a diagonal housing 73 outside of the bell and sleeve, this normally being covered by a closure plate 74 bolted in place. Tension of the chain is adjusted by means of an arm 76 pivoted at 78, together with an adjusting bolt 80 which controls the force applied to the chain by a roller 82 carried on the free end of the arm.

Referring to Fig. 3 it will be seen that the lower end of pipe 24 is provided with a swivel member or head 84 identical to the two heads already described. The rear end of the horizontal conveyor housing 18 is flared outwardly and provided with a flange adapted to mate with the flanged mouth of the bell on this head, the two being fastened together by a circular channel assembly 86 whereby the head 84 and pipe 24 can turn about the axis of the horizontal conveyor.

The rear end of the horizontal conveyor shaft extends through the bell-shaped portion of head 84 and has a sprocket 50' keyed thereto. This sprocket, through the medium of a chain running diagonally downward to the left, drives another sprocket which in turn through bevelled gears drives worm 52 as will readily be appreciated from the foregoing description of the swivel head mechanism.

At the upper end of worm 52 bevelled gears 66 and 68, together with chain 70 and its associated sprockets, drive cross shaft 46, and this in turn through a similar chain and gear drive turns the worm 54. Thus, it will be seen that the power applied to the forward end of the horizontal conveyor 22 is transmitted first to worm 52 and by this worm to the worm 54. Accordingly, grain moved rearwardly in the horizontal conveyor below the truck bed enters the bell-shaped portion of head 84, passes through the aperture corresponding to 38 in Fig. 4 in the side wall of the head and is moved upwardly by conveyor 52; on reaching the upper end of the tube 24 it passes through aperture 38 and enters conveyor 54 which carries it laterally to the discharge point.

Tubular housing 24 is adapted to pivot about its lower end relative to the axis of the horizontal conveyor, and tubular housing 26 is adapted to pivot relative to the upper end of tube 24 so that the discharge end of tube 26 may be placed on the right or left-hand side of the truck, may be made high or low, or may be positioned nearer or farther from the truck as desired. Handles 88 are provided on tube 26 for the purpose of adjusting the position of the jointed auxiliary conveyor.

When not in use the conveyor is rigidly fixed to supporting brackets or frames 92 and 94, as shown in Fig. 1, by means of straps 96. In this position, it will be noted that the end of pipe 26 extends downwardly through aperture 98 in the rear of the truck bed. If desired the conveyor can be operated while in this position to discharge grain underneath the bed of the truck.

When the unit is unstrapped, tube 24 can be swung up to and beyond the vertical without removing the end of pipe 26 from the aperture 98. This is useful when the truck is backed up to a dock for loading purposes, because it clears a path into the truck along the right-hand side thereof; at the same time the whole conveyor is kept within the space between the sides of the truck body, and consequently the truck can be positioned closely adjacent to objects such as other trucks parked at the loading dock without damage to the conveyor.

A coil spring 90 is arranged to assist in the erection of pipe 24, and this spring together with chain 100, which is adjustable in length, serve to maintain the pipe at the selected angle whenever the conveyor is operating.

From the foregoing description it will be seen that this invention is one well adapted to attain all of the ends and objects hereinbefore set forth, together with other advantages which will be obvious and which are inherent to the apparatus.

It will be understood that certain features and subcombinations are of utility and may be employed without reference to other features and subcombinations. This is contemplated by and is within the scope of the claims.

Inasmuch as various embodiments of the invention may be made without departing from the scope thereof, it is to be understood that all matter herein set forth or shown in the accompanying drawings is to be interpreted as illustrative and not in a limiting sense.

Having thus described my invention, I claim:

1. In combination, a pair of screw conveyors each comprising a conduit with an aperture in the side wall thereof, a shroud on the outside of each conduit encircling the aperture and forming a duct whose axis is crosswise of the axis of the conduit, means supporting the two ducts end-to-end so they are rotatable relative to one another about their common axis, a shaft in the ducts aligned with said common axis, and rotatable worms in the respective conduits connected to opposite ends of the shaft whereby a driving force applied to one worm is transmitted through said shaft to the other worm.

2. In combination, a pair of screw conveyors each comprising an elongated housing with a rotatable worm therein, a swivel coupling between the housings including a duct through which the housings communicate with one another regardless of their angular relationship, said coupling constructed and arranged to always maintain the axis of one of said housings in a predetermined plane parallel to axis of the other housing, a source of power connected to one worm for rotating same in its housing, and said swivel coupling including a drive connection between the two worms whereby the rotation of said one worm always is transmitted to the other worm.

3. In combination, an elevator having a material intake aperture in its lower end, a swivel mounting for said elevator at its lower end whereby it is adapted to swing in a vertical plane about its material intake aperture as a center, a conveyor having one end connected to the free upper end of said elevator whereby said conveyor is supported by said elevator in material-receiving relationship thereto, adjustment means in the connection between the elevator and conveyor for changing the angular relationship of the two, said adjustment means constructed and arranged to always maintain said conveyor in a vertical plane, and material advancing mechanism in the conveyor connected to and driven by the elevator.

4. In combination, a horizontal screw conveyor having a source of power connected to one end, an elevator having its material intake connected to the other end of said conveyor in material-receiving relation thereto, adjustment means in the connection between said elevator and conveyor for altering the angular relationship of the two, material elevating mechanism in said elevator connected to and driven by said screw conveyor, a second conveyor having one end connected to the free upper end of said elevator whereby said second conveyor is supported by said elevator in material-receiving relationship thereto, adjustment means in the connection between the elevator and said second conveyor for changing the angular relationship of the two, and material-advancing mechanism in the second conveyor connected to and driven by the elevator.

5. A combination as in claim 4 wherein said material-elevating mechanism comprises a rotating worm in said elevator.

6. A material-handling system for a truck, comprising a horizontal screw conveyor under the bed of the truck having material intakes communicating with the truck bed, a source of power connected to the forward end of the conveyor, an elevator having its material intake connected to the rear end of said horizontal conveyor in material-receiving relationship thereto, said elevator extending upwardly through an aperture in the bed of the truck, adjustment means in the connection between the elevator and the conveyor for altering the angular relationship of the two, material-elevating mechanism in said elevator connected to and driven by said screw conveyor, a second conveyor having one end connected to the free upper end of said elevator whereby said second conveyor is supported by the elevator in material-receiving relationship thereto, adjustment means in the connection between the elevator and said second conveyor for changing the angular relationship of the two, and material-advancing mechanism in the second conveyor connected to and driven by said elevator.

7. In a material-handling system as claimed in claim 6, an aperture in the bed of the truck for receiving the free end of said second conveyor.

8. A material handling system for a truck, comprising a horizontal screw conveyor communicating with the truck bed, a source of power connected to one end of the conveyor, an elevator having its material intake connected to the other end of said conveyor in material-receiving relationship thereto, a swivel joint in the connection between said elevator and conveyor for altering the angular relationship of the two but always maintaining said elevator in a vertical plane, material elevating mechanism in said elevator connected to and driven by said screw conveyor, a second conveyor having one end connected to the free end of said elevator in material-receiving relationship thereto, adjustment means in the connection between the elevator and said second conveyor for changing the angular relationship of the two but always maintaining said second conveyor in a vertical plane, and material-advancing mechanism in the second conveyor connected to and driven by the elevator.

9. In combination, three conveyors each comprising an elongated housing with a rotatable worm therein, said housings connected end to end in serial relationship, the connection between each end housing and the intermediate housing in the series comprising a swivel joint having a duct through which the adjoining housings communicate regardless of their angular relationship, said swivel joints constructed and arranged to permit movement of the intermediate housing and one end housing only in planes perpendicular to the axis of the other end housing, a drive connection between each end of the intermediate worm and the worm in the adjoining end housing, and power means connected to one of said worms for rotating it and the remaining two worms through said drive connections.

ALFRED L. MILLER.

REFERENCES CITED

The following references are of record in the file of this patent:

UNITED STATES PATENTS

| Number | Name | Date |
|---|---|---|
| 1,785,604 | Tellefsen | Dec. 16, 1930 |
| 2,239,256 | Siren | Apr. 22, 1941 |
| 2,296,014 | Benzel, Sr., et al. | Sept. 15, 1942 |
| 2,360,776 | Kozak et al. | Oct. 17, 1944 |
| 2,417,020 | Shugart | Mar. 4, 1947 |
| 2,438,301 | Schulte | Mar. 23, 1948 |
| 2,439,541 | Hall | Apr. 13, 1948 |